United States Patent
Kolanowski et al.

(10) Patent No.: US 10,819,676 B1
(45) Date of Patent: Oct. 27, 2020

(54) SYSTEM AND METHOD OF ACQUIRING NETWORK-CENTRIC INFORMATION FOR CUSTOMER PREMISES EQUIPMENT (CPE) MANAGEMENT

(71) Applicant: Verizon Patent and Licensing Inc., Arlington, VA (US)

(72) Inventors: Stephen J. Kolanowski, Keller, TX (US); Samirkumar Patel, Middlesex, NJ (US); Angel V. Gomez, Fort Worth, TX (US); Snehal Desai, Old Bridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/419,246

(22) Filed: May 22, 2019

(51) Int. Cl.
*H04L 29/12* (2006.01)
*H04W 8/20* (2009.01)
*H04W 80/10* (2009.01)
*H04W 4/50* (2018.01)

(52) U.S. Cl.
CPC ...... *H04L 61/2015* (2013.01); *H04L 61/2076* (2013.01); *H04L 61/6022* (2013.01); *H04W 4/50* (2018.02); *H04W 8/20* (2013.01); *H04W 80/10* (2013.01)

(58) Field of Classification Search
None
See application file for complete search history.

(56) References Cited

U.S. PATENT DOCUMENTS

| | | | | |
|---|---|---|---|---|
| 6,768,743 | B1* | 7/2004 | Borella | H04L 29/12358 370/401 |
| 10,219,310 | B2* | 2/2019 | Kanugovi | H04W 28/12 |
| 10,404,654 | B1* | 9/2019 | Velusamy | H04L 61/2015 |
| 2003/0005096 | A1* | 1/2003 | Paul | H04L 29/06 709/222 |
| 2004/0103275 | A1* | 5/2004 | Ji | H04W 84/12 713/150 |
| 2004/0128367 | A1* | 7/2004 | Piercy | H04L 41/26 709/220 |

(Continued)

OTHER PUBLICATIONS

S. Alexander et al. "DHCP Options and BOOTP Vendor Extensions." Network Working Group, Request for Comments: 2132, Mar. 1997, 34 pages.

*Primary Examiner* — Christopher T Wyllie

(57) ABSTRACT

A method, device, and computer-readable medium are provided to send, by a first consumer-premises equipment (CPE) device to a second CPE device in a local area network (LAN), a first request for an IP address, wherein the first request is a first signaling message that includes a first protocol configuration option (PCO) providing first network-centric information for the first CPE device; receive, from the second CPE device, an acknowledgement to the first request, wherein the acknowledgment is a second signaling message that includes the IP address and a second PCO providing second network-centric information for the second CPE device; connect, via the second CPE device, to a bootstrap server device via a radio access network (RAN); receive, via the second CPE device, attachment information associated with a network management server; and send, via the second CPE device, the second network-centric information to the network management server in a first attach.

20 Claims, 11 Drawing Sheets

(56) References Cited

U.S. PATENT DOCUMENTS

| | | | |
|---|---|---|---|
| 2005/0149924 A1* | 7/2005 | Komarla | G06F 21/575 717/176 |
| 2006/0161663 A1* | 7/2006 | Palm | H04L 47/70 709/227 |
| 2007/0011301 A1* | 1/2007 | Ong | H04L 61/2015 709/224 |
| 2007/0230415 A1* | 10/2007 | Malik | H04L 41/0806 370/338 |
| 2008/0114857 A1* | 5/2008 | Snider | H04L 61/2015 709/217 |
| 2008/0155657 A1* | 6/2008 | Ogura | H04L 63/08 726/3 |
| 2009/0019167 A1* | 1/2009 | Taaghol | G06F 9/4416 709/228 |
| 2009/0150526 A1* | 6/2009 | Wu | H04L 41/044 709/220 |
| 2010/0191813 A1* | 7/2010 | Gandhewar | H04L 61/2015 709/206 |
| 2010/0191839 A1* | 7/2010 | Gandhewar | H04L 61/2015 709/220 |
| 2010/0325247 A1* | 12/2010 | Levkowetz | H04L 61/2053 709/220 |
| 2011/0028085 A1* | 2/2011 | Waung | H04W 88/04 455/7 |
| 2011/0170554 A1* | 7/2011 | De Smedt | H04L 69/14 370/401 |
| 2012/0278888 A1* | 11/2012 | Lin | H04L 63/1441 726/23 |
| 2013/0138823 A1* | 5/2013 | Centemeri | H04L 67/141 709/228 |
| 2014/0161055 A1* | 6/2014 | Chitrapu | H04W 36/28 370/329 |
| 2014/0185603 A1* | 7/2014 | Kaippallimalil | H04L 63/162 370/338 |
| 2014/0321328 A1* | 10/2014 | Zuniga | H04W 8/24 370/254 |
| 2014/0341109 A1* | 11/2014 | Cartmell | H04L 43/50 370/328 |
| 2015/0006689 A1* | 1/2015 | Szilagyi | H04L 41/0806 709/222 |
| 2015/0350912 A1* | 12/2015 | Head | H04L 63/08 726/4 |
| 2015/0365911 A1* | 12/2015 | Mohandas | H04W 56/001 370/338 |
| 2016/0174107 A1* | 6/2016 | Kanugovi | H04L 12/28 370/236 |
| 2016/0227471 A1* | 8/2016 | De Foy | H04L 12/4633 |
| 2016/0277211 A1* | 9/2016 | Kumar | H04L 12/2898 |
| 2016/0359805 A1* | 12/2016 | Spraggs | G06F 8/60 |
| 2017/0026335 A1* | 1/2017 | Dhulipala | H04L 41/0806 |
| 2018/0034698 A1* | 2/2018 | Perez | H04L 41/0886 |
| 2018/0152541 A1* | 5/2018 | Mathison | H04L 67/02 |
| 2019/0356482 A1* | 11/2019 | Nix | H04L 41/0809 |
| 2019/0372853 A1* | 12/2019 | Bainbridge | H04L 49/354 |
| 2020/0162419 A1* | 5/2020 | Zeng | H04L 61/2015 |

\* cited by examiner

| CODE<br>810 | LENGTH<br>820 | VALUE<br>830 |
|---|---|---|
| 1 | 2 | IMEI |
| 2 | 2 | ICCID |
| 3 | 2 | IMSI |
| 4 | 2 | MACIDU |
| 5 | 2 | MACODU |
| 6 | 2 | MDN |
| 7 | 2 | WIFI SSID |
| 8 | 2 | WIFI PASSWORD |
| ⋮ | ⋮ | ⋮ |
| X | Y | Z |

SYSTEM AND METHOD OF ACQUIRING NETWORK-CENTRIC INFORMATION FOR CUSTOMER PREMISES EQUIPMENT (CPE) MANAGEMENT

BACKGROUND

A network management protocol such as Dynamic Host Configuration Protocol (DHCP) may be used on user datagram protocol (UDP)/Internet protocol (IP) networks, such as local area networks (LANs) connecting customer-premises equipment (CPE). CPE LAN management protocol may provide support functions for auto-configuration, software/firmware image management, software module management, status and performance management, and diagnostics. CPE networking devices, such as modems, routers, and/or extenders, may be configured with CPE LAN management protocol functionality for remote management by, for example, a service provider's management server, e.g., auto-configuration server (ACS).

DETAILED DESCRIPTION OF PREFERRED EMBODIMENTS

The following detailed description refers to the accompanying drawings. The same reference numbers in different drawings may identify the same or similar elements.

The use of next generation (e.g., 5G) RANs allows Internet service providers (ISPs) to use wireless backhaul connections to subscribers' CPE LANs, instead of wired connections (e.g., coaxial cable, fiber optic, copper, etc.) that have been traditionally used for providing ISP-type services. However, this presents the challenge of getting network-centric information (e.g., device identities) from the LAN to carriers' management servers (e.g., ACSs), to allow for remote management and monitoring services like data collection, analysis, reporting, etc. In most cases, ISPs' customer service representatives are not currently able to "see" behind the subscribers' indoor unit (IDU) and or outdoor unit (ODU) (e.g., 5G modem, bridge, etc.) to other CPEs, such as routers and extenders in subscribers' LANs. This may inhibit, for example, an ISP's ACS from troubleshooting, implementing software updates, creating and/or maintaining an inventory of CPE devices that are connected to a subscriber's registered IDU/ODU, etc.

Systems and methods described herein resolve the challenge of passing network-centric information between wireline and wireless networks by implementing non-standardized extensions for one or more network management protocols. Optional configuration parameters may be used to pass CPE data from one type of data model (e.g., TR-069) to another type of data model (e.g., Open Mobile Alliance (OMA) device management (DM)). For example, a router device in a LAN may send to an IDU/ODU device in the LAN, a first request for a public IP address, wherein the first request is a DHCP message that includes a first protocol configuration option (PCO) providing first network-centric information for the IDU/ODU device. The router device may receive from the IDU/ODU device, an acknowledgement that includes the IP address and a second PCO providing second network-centric information for the IDU/ODU device. The router device may connect to a bootstrap server device in a carrier's core network via a radio access network and via the IDU/ODU device. The router device may receive, from the bootstrap server, attachment information associated with a network management server in the core network, and provide the second network-centric information to the network management server in an attachment process using the attachment information.

Figure 1:
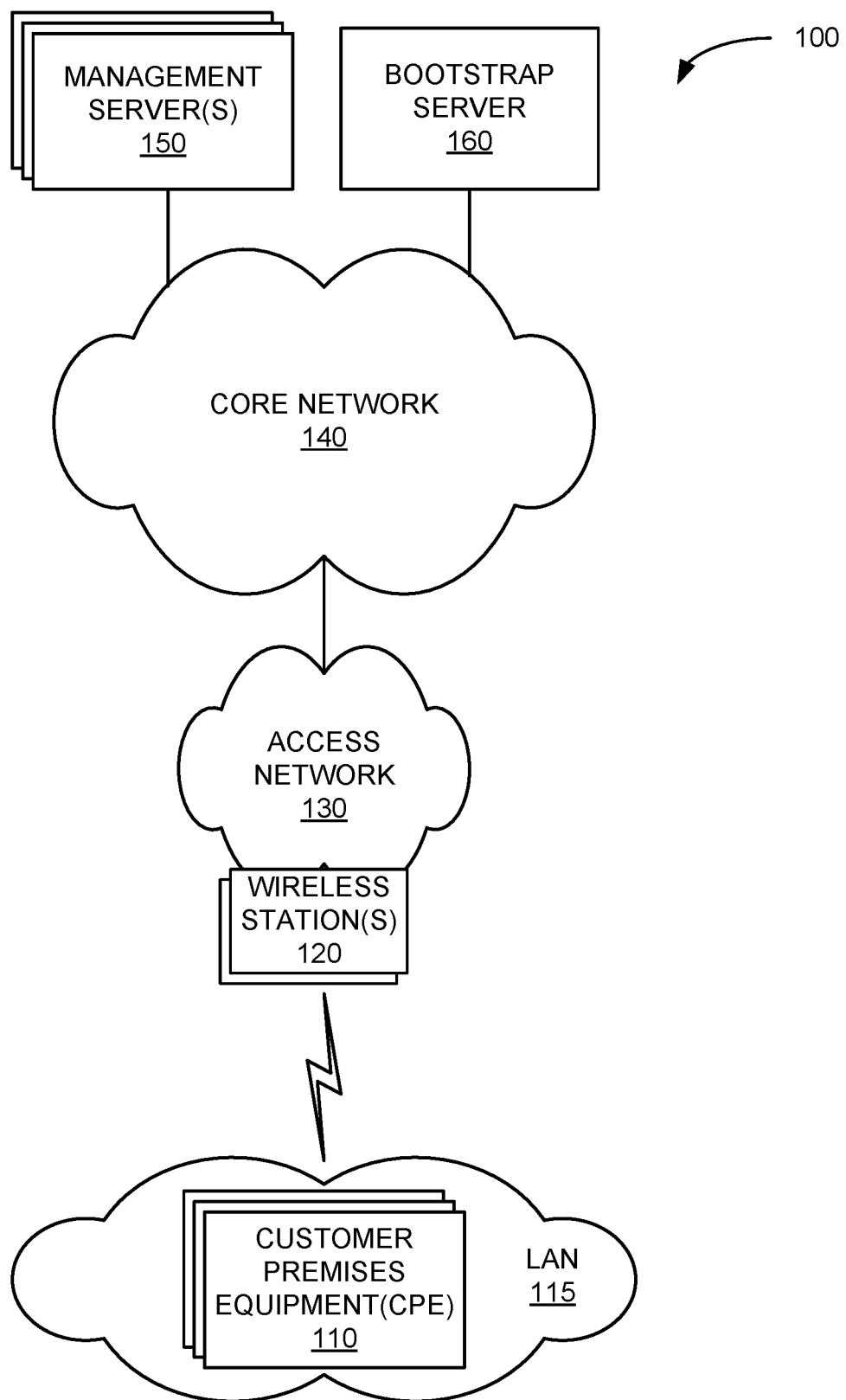
FIG. 1 is a diagram illustrating an exemplary network environment according to an implementation described herein.

FIG. 1 is a diagram illustrating an exemplary environment 100 in which systems and methods described herein may be implemented. As illustrated, environment 100 may include customer premises equipment (CPE) 110, local area network (LAN) 115, wireless stations 120, an access network 130, a core network 140, one or more management servers 150, and a bootstrap server 160.

CPE 110 may include any network device such as a modem, a router, an extender, a server, a set-top box, a virtual assistant, a peripheral device, and/or any other type of computer device with communication and/or output capabilities. In some implementations, CPE 110 may correspond to a wireless device that communicates wirelessly with other devices in LAN 115. In other implementations, CPE 110 may correspond to wired device that communicates via a wired connection with other devices in LAN 115. In some implementations, LAN 115 may be another type of network, such as a wide area network (WAN), a metropolitan area network (MAN), an enterprise network, etc., located at a customer premises. CPE 110 may also include a network device that wirelessly communicates with access network 130.

Wireless stations 120 may include a gNodeB (gNB) base station device that includes one or more devices (e.g., wireless transceivers) and other components and functionality that allow CPE 110 to wirelessly connect to access network 130. Wireless stations 120 may correspond to a macrocell or to a small cell (e.g., a femtocell, a picocell, a microcell, etc.). In other implementations, wireless stations 120 may include another type of base station (e.g., an evolved Node B (eNB), etc.) for another type of wireless network. CPE 110 may wirelessly communicate with access network 130 via the base station.

Access network (or RAN) 130 may provide access to core network 140 for CPE 110. Access network 130 may enable CPE 110 to communicate with device management servers 150 and/or bootstrap 160. Access network 130 may establish a packet data network connection between CPE 110 and core network 140. For example, access network 130 may establish an Internet Protocol (IP) connection between CPE 110 and core network 140. In some implementations, access network 130 may include a 5G access network, a 4G access network, a 4.5G access network, or a combination thereof.

Core network 140 may include a 4G core network, a 4.5G core network, a 5G core network, a LAN, a WAN, a MAN, an optical network, a cable television network, a satellite network, an ad hoc network, a telephone network (e.g., the Public Switched Telephone Network (PSTN) or a cellular network), an intranet, the Internet, or a combination of networks. Core network 140 may allow the delivery of IP-type services to CPE 110, and may interface with other external networks. Core network 140 may include one or more server devices and/or network devices, or other types of computation or communication devices. In one example implementation, core network 140 may include an IP Multimedia Subsystem (IMS) network (not shown in FIG. 1). An IMS network may include a network for delivering IP multimedia services and may provide media flows between CPE device 110 and external IP networks or external circuit-switched networks (not shown in FIG. 1).

Management server 150, also referred to as ACS 150, may include one or more network devices, such as computer devices and/or server devices, which maintain device configuration settings and data collection parameters for CPE 110. Management server 150 may register CPE 110 and manage device configuration parameters (such as an access point name (APN) table configuration). Management server 150 may receive from CPE 110 various key performance indicators and measurements (such as network signal strength) that can be used for internal or external data analysis services. In some implementations, multiple management servers 150 may be deployed in environment 100 for scale purposes and each of CPE 110 may be assigned to a particular management server 150.

Bootstrap server 160 may include one or more network devices, such as computer devices and/or server devices, which facilitate load balancing and secure communications between CPE 110 and management server 150. For example, bootstrap server 160 may act as an intermediary element in environment 100 that provides application-independent functions for mutual authentication of network devices (e.g., CPE 110) and application servers (e.g., management server 150) to each other and for "bootstrapping" the exchange of secret session keys afterwards. The bootstrap procedure may be initiated, for example, during initial power-up of CPE 110 or in response to a message from a device in core network 140 instructing CPE 110 to begin a bootstrap operation.

Although FIG. 1 shows exemplary components of environment 100, in other implementations, environment 100 may include fewer components, different components, differently-arranged components, or additional functional components than depicted in FIG. 1. Additionally or alternatively, one or more components of environment 100 may perform functions described as being performed by one or more other components of environment 100.

Figure 2:
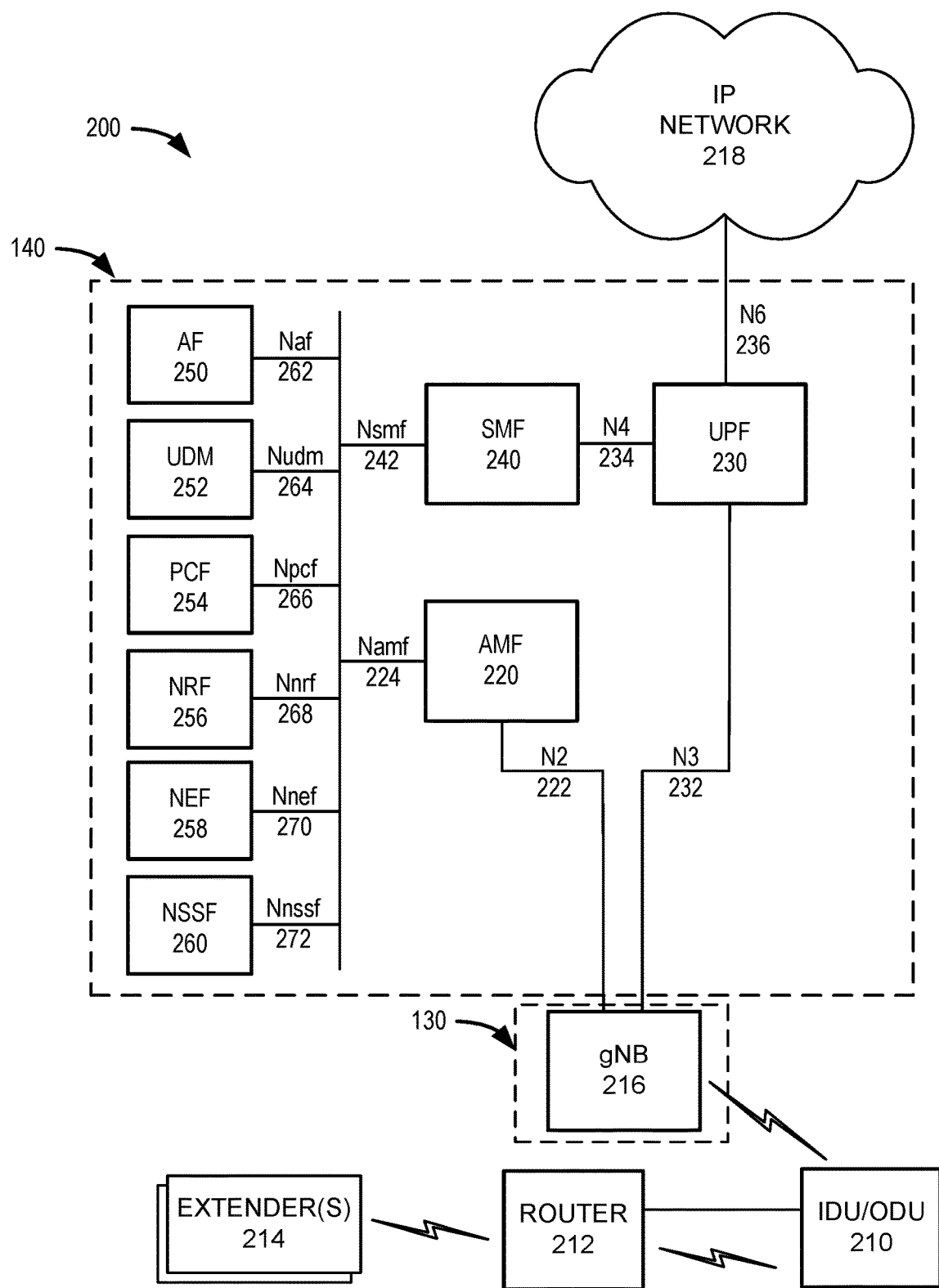
FIG. 2 is a diagram illustrating exemplary devices of the network environment of FIG. 1.

FIG. 2 is a diagram illustrating a network environment 200 that includes exemplary components of environment 200 according to an implementation described herein. As shown in FIG. 2, network environment 200 may include an indoor unit (IDU)/outdoor unit (ODU) 210, a router 212, an extender 214, a gNB 216, core network 140, and an IP network 218. Core network 140 and IP network 218 may correspond to, or be included in, a provider network.

IDU/ODU 210 may include a network device configured to receive and transmit RF signals. In one implementation, IDU/ODU 210 may include a 5G modem corresponding to an ODU, capable of wirelessly communicating with gNB 216, for example, using a dynamic IP address. In one implementation, IDU/ODU 210 may include a bridge device corresponding to an IDU, capable of communicating with router 212. Router 212 may include a network device capable of communicating with IDU/ODU and establishing Wi-Fi in LAN 115. In one implementation, router 212 may access RAN 130 via IDU/ODU 210, using a dynamic IP address shared from IDU/ODU 210. Extender 214 may include a network device capable of communicating with router 212 and extending the Wi-Fi service within LAN 115. In one implementation, router 212 may access RAN 130 via router 212.

gNB 216 may include one or more devices and other components and functionality that enable IDU/ODU 210 to wirelessly connect to access network 130 using 5G Radio Access Technology (RAT). gNB 216 may include a wireless transceiver with an antenna array configured for mm-wave wireless communication. gNB 216 may communicate with AMF 220 using an N2 interface 222 and communicate with UPF using an N3 interface 232.

Core network 140 may include an Access and Mobility Management Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Network Slice Selection Function (NSSF) 260. AMF 220, UPF 230, SMF 240, AF 250, UDM 252, PCF 254, NRF 256, NEF 258, and NSSF 260 may each be implemented as separate network devices or as nodes shared among one or more network devices. While FIG. 2 depicts a single AMF 220, UPF 230, SMF 240, AF 250, UDM 252, PCF 254, NRF 256, NEF 258, and NSSF 260 for illustration purposes, in practice, FIG. 2 may include AMFs 220, UPFs 230, SMFs 240, AFs 250, UDMs 252, PCFs 254, NRFs 256, NEFs 258, and/or NSSFs 260.

AMF 220 may perform registration management, connection management, reachability management, mobility management, lawful intercepts, short message service (SMS) transport between CPE 110 and an SMS function (not shown in FIG. 2), session management messages transport between CPE 110 and SMF 240, access authentication and authorization, location services management, functionality to support non-3GPP access networks, and/or other types of management processes. AMF 220 may be accessible by other function nodes via a Namf interface 224.

UPF 230 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a RAN node (e.g., wireless station 120), and/or perform other types of user plane processes. UPF 230 may communicate with SMF 240 using an N4 interface 234 and connect to IP network 218 using an N6 interface 236.

SMF 240 may perform session establishment, modification, and/or release, perform IP address allocation and management, perform DHCP functions, perform selection and control of UPF 230, configure traffic steering at UPF 230 to guide traffic to the correct destination, terminate interfaces toward PCF 254, perform lawful intercepts, charge data collection, support charging interfaces, control and coordinate charging data collection, termination of session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for CPE 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via an Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via an Npcf interface 266.

NRF 256 may support a service discovery function and maintain a profile of available network function (NF) instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via an Nnef interface 270.

Although FIG. 2 shows exemplary components of core network 140, in other implementations, core network 140 may include fewer components, different components, differently arranged components, or additional components than depicted in FIG. 2. Additionally or alternatively, one or more components of core network 140 may perform functions described as being performed by one or more other components of core network 140. For example, core network 140 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, core network 140 may include a reference point architecture that includes point-to-point interfaces between particular function nodes.

Figure 3:
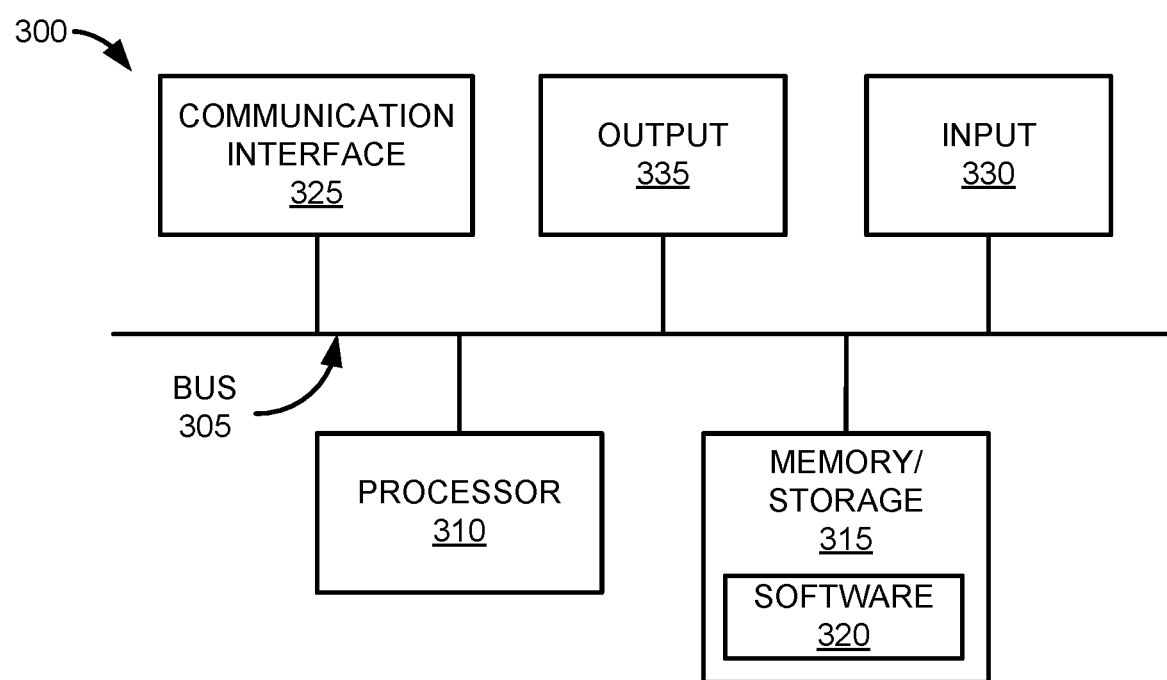
FIG. 3 is a diagram illustrating exemplary components that may be included in a device of FIG. 2.

FIG. 3 is a diagram illustrating example components of a device 300 according to an implementation described herein. IDU/ODU 210, router 212, extender 214, gNB 216, AMF 220, UPF 230, SMF 240, AF 250, UDM 252, PCF 254, NRF 256, NEF 258, NSSF 260, and/or other components of access network 130 and/or core network 140 may each include one or more devices 300. In another implementation, device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, UE device 110 and/or wireless station 130 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
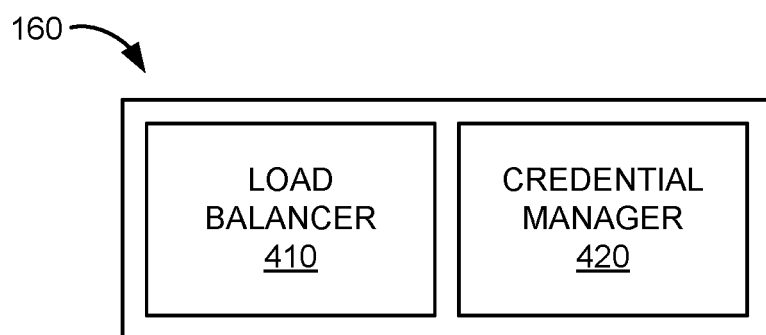
FIG. 4 is a diagram illustrating exemplary functional components of the bootstrap server of FIG. 1.

FIG. 4 is a diagram illustrating exemplary functional components of bootstrap server 160 according to an implementation described herein. The functional components of bootstrap server 160 may be implemented, for example, via processor 310 executing instructions from memory 315. As shown in FIG. 4, bootstrap server 160 may include a load balancer 410 and a credential manger 420.

Load balancer 410 may receive service requests from CPE 110 for a management server address (e.g., an ACS). Load balancer 410 may load balance the requests over multiple management servers 150. For example, load balancer 410 may assign particular CPEs 110 to particular management servers 150 based on available resources (e.g., best processing times, error rates, quality-of-service requirements, service/maintenance schedules, etc.), geography of CPE 110, number of assigned devices, cost metrics, etc. In one implementation, environment 100 may include multiple redundant management servers 150 (e.g., with geographic diversity). For example, management servers 150 may be located in different regions or states to minimize communication path lengths and/or limit impact from localized failures (e.g., power disruptions, natural disasters, etc.).

Credential manager 420 may provide credentials, such as a session key, for use by CPE 110 with the assigned management server 150. Credential manager 420 may arrange secure keys with CPE 110 and later provide the secure keys to assigned management server 150 (e.g., upon request from management server 150 when CPE 110 attempts to establish a connection). In one implementation, CPE 110 may store a secure key generated by credential manager 420 and may use the secure key to send encrypted device-specific data (e.g., an International Mobile Equipment Identity (IMEI), an integrated circuit card identifier (ICCID), etc.) to assigned management server 150. Assigned management server 150 may use the secure key obtained from credential manager 420 to decrypt the message from CPE 110 and validate CPE 110.

Figure 5:
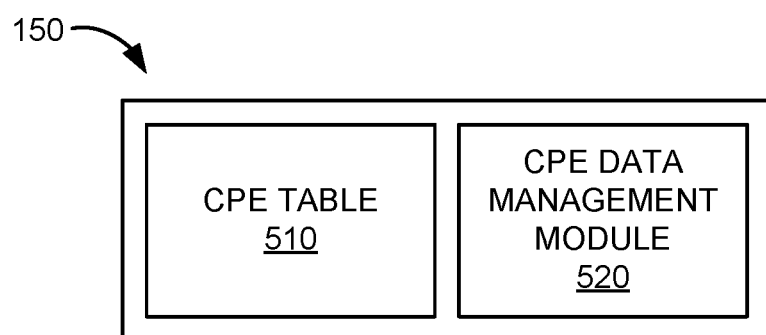
FIG. 5 is a diagram illustrating exemplary functional components of the management server of FIG. 1.

FIG. 5 is a diagram illustrating exemplary functional components of management server 150 according to an implementation described herein. The functional components of management server 150 may be implemented, for example, via processor 310 executing instructions from memory 315. As shown in FIG. 5, management server 150 may include a CPE table 510 and a CPE data management module 520.

CPE table 510 may track registration status and services for individual CPEs 110 assigned to particular management server 150. In one implementation, a record for each CPE 110 may include, among other information, a unique ID for CPE 110 (e.g., an IMEI, an international mobile subscriber identity (IMSI), a mobile directory number (MDN), a media access control (MAC) identifier (ID), etc.) and a bootstrap status flag. In other implementations, CPE table 510 may include additional information about each CPE 110, such as a subscriber account, device type, etc.

The bootstrap status flag, for example, may be toggled "on" when CPE 110 has successfully completed a registration with management server 150 via bootstrap server 160. As long as the bootstrap status flag is toggled on, CPE 110 may connect to assigned management server 150 without again contacting bootstrap server 160. The bootstrap status flag, for example, may be toggled "off" when CPE 110 is required to re-connect through bootstrap server 160. In one example, the bootstrap status flag may be toggled off when CPE 110 fails to provide matching credentials. In another example, the bootstrap status flag may be toggled off when a security change or upgrade is implemented (e.g., by direction of a network administrator). In some implementations, CPE 110 may be required to re-attach to access network 130 to submit a new bootstrap server address request.

CPE data management module 520 may include configuration settings for CPE data. For example, CPE data management module 520 may allow for remote changes that manage what types of data are provided by CPE 110, what frequency that data is to be provided, data formats, retry intervals, security protocols, and the like. In one implementation, CPE data management module 520 may conform to DHCP and TR-069.

Figure 6:
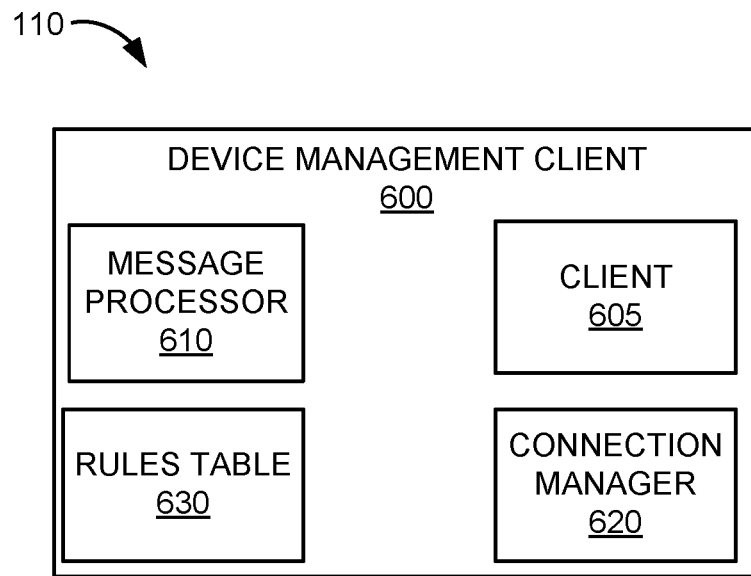
FIG. 6 is a diagram illustrating exemplary functional components of the CPE of FIG. 1.

FIG. 6 is a diagram illustrating exemplary functional components of CPE 110 according to an implementation described herein. The functional components of CPE 110 may be implemented, for example, via processor 310 executing instructions from memory 315.

Alternatively, some or all of the functional components of CPE 110 may be implemented via hard-wired circuitry. As shown in FIG. 6, CPE 110 may include a device management client 600. Device management client 600 may manage device registration and instructions for CPE 110. As shown in FIG. 6, device management client 600 may include a client, a message processor 610, a connection manager 620, and a rules table 630.

In one implementation, client 605 (e.g., a TR069-enabled client) may support DHCP options such as standardized and/or registered/unregistered vendor extensions (e.g., Option code 43, Option code 60, etc. as identified in the Network Working Group's Request for Comment (RFC) 2132, Internet Assigned Numbers Authority (IANA) protocol registry, etc.). In some implementations, client 605 may cause DHCP to send the vendor class identifier (VCI) 5G CPE in a DHCP Request message (e.g., using Option code 60) to a CPE 110 modem device. In response, client 605 may cause CPE 110 modem devices to send a DHCP Acknowledgement message with DHCP and vendor-specific information (VSI) (e.g., using Option code 43 including sub-options). The sub-options may include fields for a code, a length, and value data as described herein. In one implementation, client 605 may cause CPE 110 to recognize the sub-options and VSI.

In some implementations, client 605 may cause CPE 110 router devices to not send any VSI (and/or Option code 43 data) to other CPE 110 devices via a LAN interface. In other implementations, client 605 may cause CPE 110 router devices to use CPE modem devices Wi-Fi SSID and password for wireless LAN connectivity. In one implementation, client 605 may cause CPE router devices to share the VSI to a network management server device (e.g., ACS) during first inform (e.g., post-bootstrapping).

Message processor 610 may detect messages, such as DHCP messages received from within LAN 115 and/or RF signaling received from access network 130 via an IP address, and may process the detected messages. According to an implementation described herein, message processor 610 may identify a VCI value in a received DHCP message and may return a corresponding VSI value. Additionally or alternatively, message processor 610 may identify and return a sub-option value from a plurality of sub-options values defined for various VCI/VSI values.

Connection manager 620 may be provisioned with a bootstrap server address (e.g., as part of an attach procedure) and the use the bootstrap server address to communicate with bootstrap server 160 and obtain connection information (e.g., an address, credentials, etc.) for an assigned management server 150. Connection manager 620 may use the connection information to register with the assigned management server 150. In one implementation, connection manager 620 may store the connection information or updated credentials for use in subsequent communications with management server 150.

Rules table 630 may include configuration parameters for CPE 110 to collect and/or report data. In one implementation, rules table 630 may include parameters and/or parameter updates received from management server 150 once CPE 110 has registered with management server 150.

Although FIGS. 4-6 show exemplary functional components of bootstrap server 160, management server 150, and CPE 110, in other implementations, these devices may include fewer functional components, different functional components, or additional functional components than depicted in FIGS. 4-6. Additionally or alternatively, one or more functional components may perform functions described as being performed by one or more other functional components.

Figure 7A:
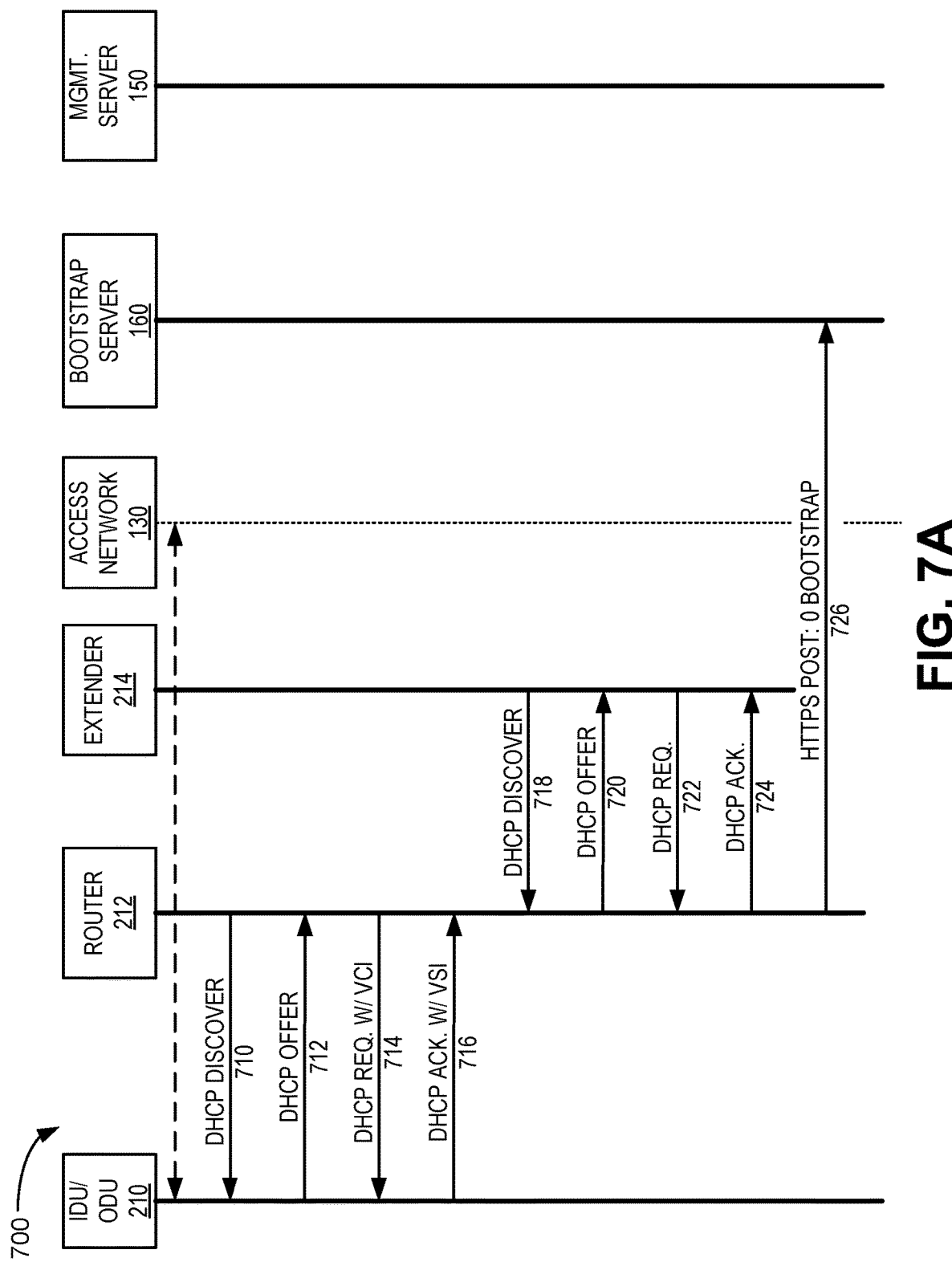
FIGS. 7A-D are exemplary call flow diagrams according to an implementation described herein.

FIGS. 7A-7D depict an exemplary process 700 for enabling CPE 110 to discover and register with a remote management server via a bootstrap server, according to an implementation described herein. As shown in FIG. 7A, call flow diagram 700 may include a TR069-enabled router 212, in LAN 115 for example, powering up and broadcasting or unicasting a DHCP Discover message 710 that is received over LAN 115 by IDU/ODU (or 5G modem) 210. In one implementation, Discover message 710 may be an IP address lease request. For example, 5G modem 210 may reserve an IP address for router 212 and make a lease offer by sending a DHCP Offer message 712 to router 212. In response, router 212 may reply with a DHCP Request message 714, requesting the IP address offered, and be configured to identify a vendor code identifier (VCI) in DHCP (e.g., Option 60), where the VCI corresponds to router 212. In response, 5G modem 210 may send a DHCP Acknowledgment message 716, specifying the IP address lease duration, and be configured to identify vendor-specific information (VSI) in DHCP (e.g., Option 43), where the VSI corresponds to 5G modem 210.

Figure 8:
FIG. 8 is a diagram illustrating exemplary sub-options according to an implementation described herein.

Acknowledgment message 716 may include one or more of the exemplary sub-options (non-standardized vendor extensions) attached to a message container that includes parameters shown in a table 800 of FIG. 8. For example, referring to FIG. 8, code field 810 parameter may correspond to a specific VSI parameter in Value field 830. Length field 820 may specify a string length (e.g., octets) of the VSI parameter. Exemplary parameter values include IMEI, ICCID, IMSI, MAC ID, MDN, Wi-Fi SSID, Wi-Fi Password, etc. In one implementation, router 212 may use the Wi-Fi SSID and password for wireless connectivity to 5G modem 210.

Although FIG. 8 shows exemplary fields for VSI data (e.g., attached to DHCP Option 43), in other implementations, VSI data may include different, differently arranged, fewer, or additional fields than those depicted in FIG. 8.

Returning to FIG. 7A, assume that process 700 includes one or more extender 214 powering up on LAN 115. For example, extender 214 may broadcast or unicast a DHCP Discover message 718 that is received over LAN 115 by router 212. In response, router 212 may reply with a DHCP Offer message 720 to extender 214. In response, extender 214 may send a DHCP Request message 722 to router 212. In response, router 212 may send a DHCP Acknowledgment message 724, to complete the connection.

Figure 7B:
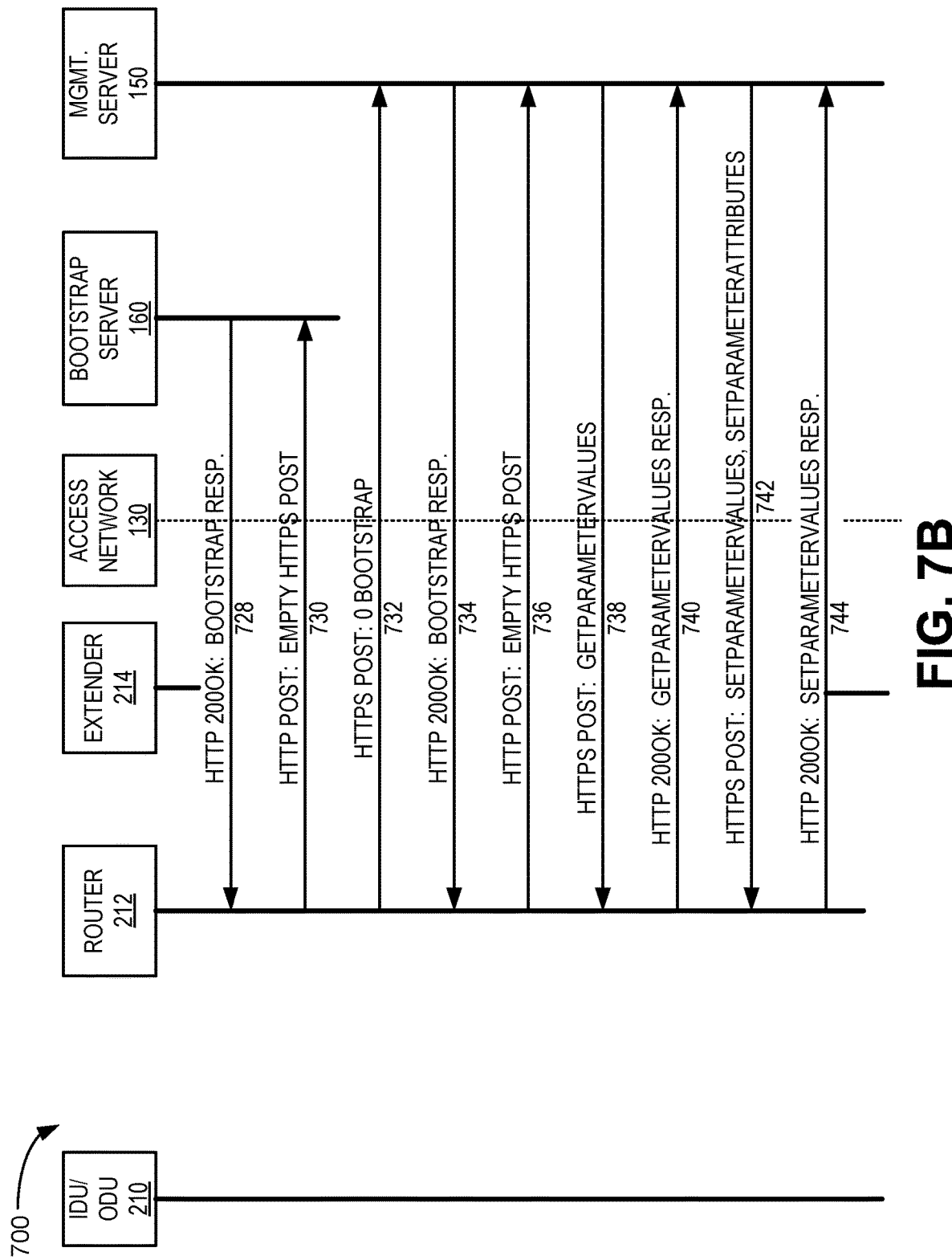
Figure 7C:
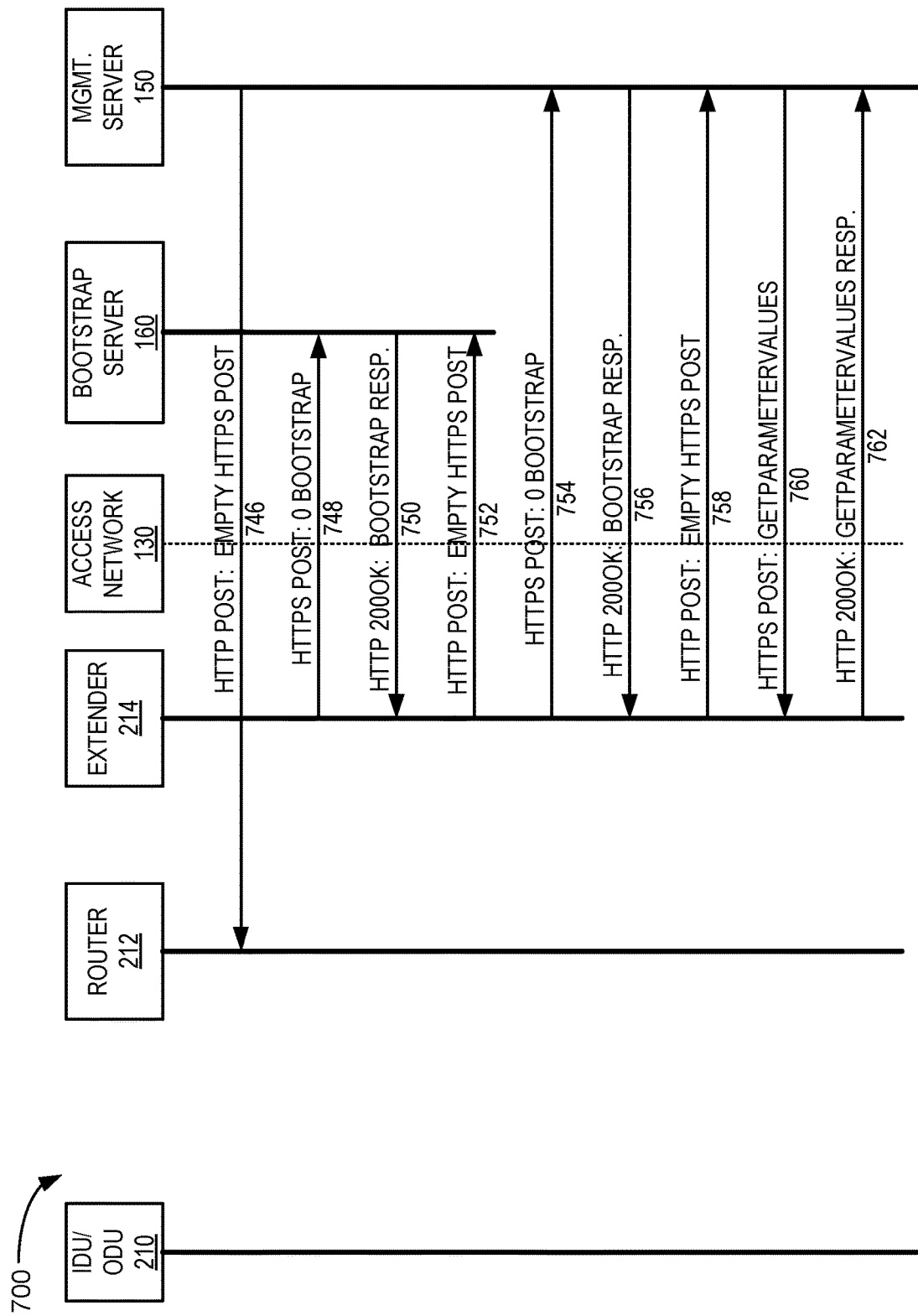
Figure 7D:
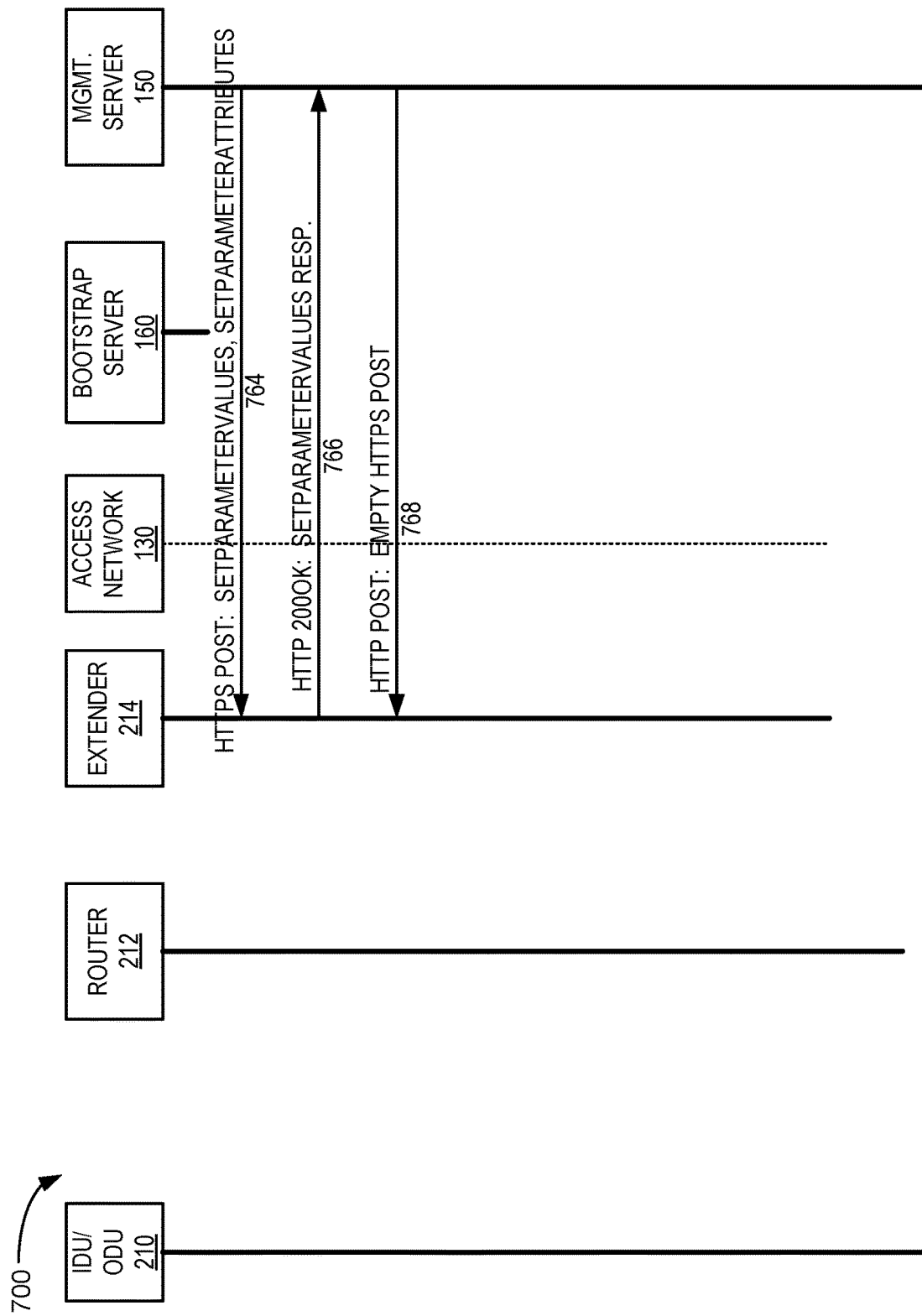

Using a provisioned bootstrap server URL, router 212 may use the shared IP address to connect to bootstrap server 160 via core network 140 and may request connection information for management server 150 (HTTPS POST: 0 BOOTSTRAP 726). Turning to FIG. 7B, Bootstrap server 160 may receive the request for management server connection information and verify, with access network 130 (or another network entity), a user profile for router 212. Assuming successful verification, bootstrap server 160 may identify an applicable management server 150 for router 212, and provide management server connection information (e.g., for management server 150) to router 212 (HTTP 2000K: BOOTSTRAP RESPONSE 728). The management server connection information may include, for example, a management server URL and a session key to allow router 212 to connect to management server 150.

In response to receiving the management server connection information, router 212 may send an HTTP POST: EMPTY HTTPS POST message 730 to bootstrap server 160, and provide a registration request to management server 150 (HTTPS POST: 0 BOOTSTRAP 732). The registration request may include an encrypted string or token based on the session key provided to router 212 by bootstrap server 160. In one implementation, the first attach process (or first inform) may also include the VSI information corresponding to 5G modem 210.

Management server 150 may receive the registration request and, assuming successful authentication (e.g., a match of the encrypted string or token), management server 150 may provide a registration response to router 212 (HTTP 2000K: BOOTSTRAP RESPONSE 734), after which router 212 and management server 150 can perform data exchanges. In one implementation, router 212 may store the session key (or an updated secure key) for management server 150. The stored key may be used for later data exchange sessions with management server 150. Router 212 may send an HTTP POST: EMPTY HTTPS POST message 736 to management server 150.

Process 700 may include management server 150 sending an HTTPS POST: GET PARAIVIETERVALUES message 738 to router 212. In response, router 212 may send an HTTP 2000K: GETPARAMETERVALUES REPSONSE message 740. In one implementation, message 740 may include the VSI corresponding to 5G modem 210. In response, management server 150 may send an HTTPS POST: SETPARAMETERVALUES, SETPARAMETERAT-TRIBUTES message 742. Process 700 may include router 212 sending an HTTP 2000K: SETPARAMETERVALUES RESPONSE message 744. Continuing with FIG. 7C, management server 150 may send an HTTP POST: EMPTY HTTPS POST message 746 to router 212.

Process 700 may include extender 214, which may be behind router 212 (e.g., using port-forwarding operations), connecting to bootstrap server 160 via core network 140 and requesting connection information for management server 150 (HTTPS POST: 0 BOOTSTRAP 748). Bootstrap server 160 may receive the request for management server connection information and verify, with access network 130 (or another network entity), a user profile for extender 214. Assuming successful verification, bootstrap server 160 may identify management server 150 for extender 214, and provide management server connection information (e.g., for management server 150) to extender 214 (HTTP 2000K: BOOTSTRAP RESPONSE 750). The management server connection information may include, for example, a management server URL and a session key to allow extender 214 to connect to management server 150. Extender 214 may send an HTTP POST: EMPTY HTTPS POST message 752.

Process 700 may include extender 214 sending an HTTPS POST: 0 BOOTSTRAP message 754 that includes a registration request. Management server 150 may receive the registration request and, assuming successful authentication, management server 150 may provide a registration response to extender 214 (HTTP 2000K: BOOTSTRAP RESPONSE 756), after which extender 214 and management server 150 can perform data exchanges. Extender 214 may send an HTTP POST: EMPTY HTTPS POST message 758 to management server 150.

Process 700 may include management server 150 sending an HTTPS POST: GET PARAMETERVALUES message 760 to extender 214. In response, extender 214 may send an HTTP 2000K: GETPARAMETERVALUES REPSONSE message 762 to management server 150. Continuing with FIG. 7D, management server 150 may send an HTTP POST: SETPARAMETERVALUES, SETPARAMETERATTRIB-UTES message 764 to extender 214. In response, extender 214 may send an HTTPS 2000K: SERPARAMETERVAL-UES RESPONSE message to management server 150. Management server 150 may send an HTTP POST: EMPTY HTTPS POST message 768 to extender 214. Signaling 748 to 768 may be repeated for any number of extenders 214 in LAN 115.

Figure 9:
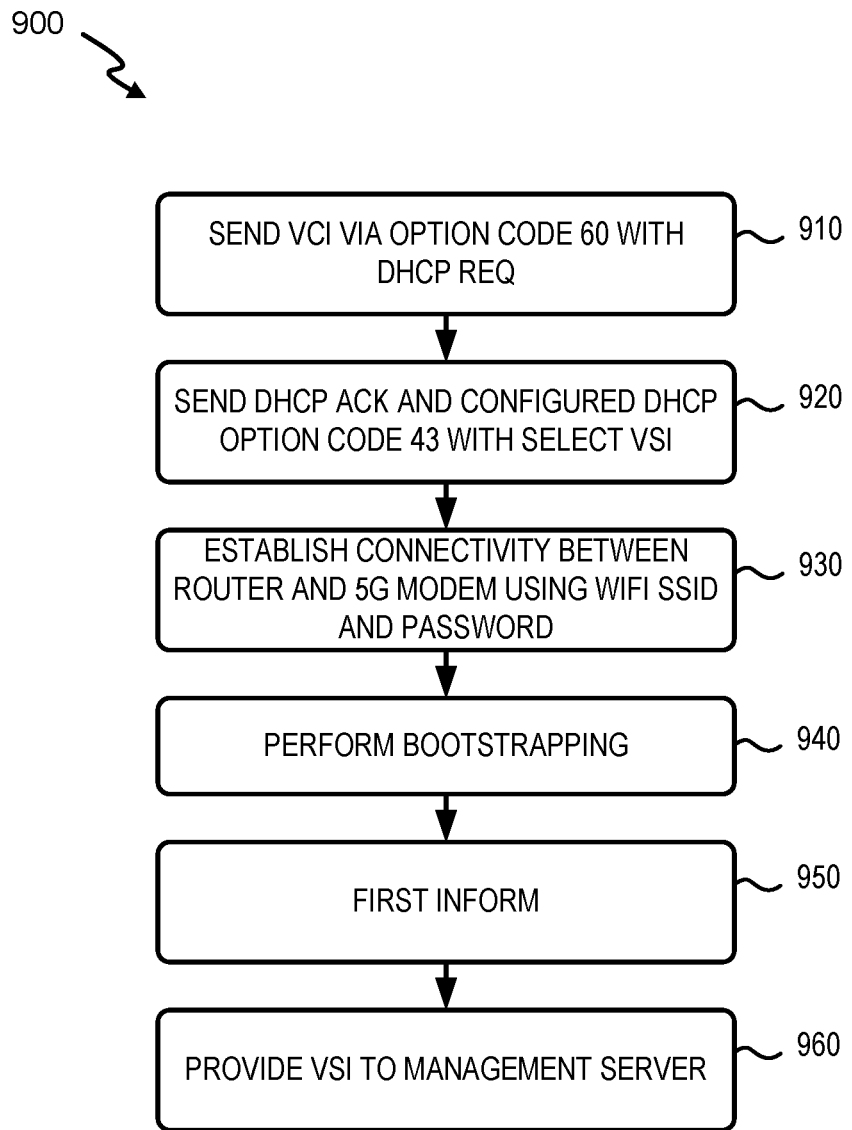
FIG. 9 is an exemplary flow diagram according to another implementation described herein.

FIG. 9 is a flow chart of an exemplary process 900 for passing network-centric information for CPE device management purposes, according to an implementation described herein. For example, a CPE 110 in a LAN 115 may obtain VSI for a network termination CPE 110 (e.g., an IDU, an ODU, etc.) and provide the VSI to management server 150 in a first inform (or thereafter).

As shown in FIG. 9, after router 212 is powered on and communication capability with 5G modem 210 is activated, router 210 may send DHCP Option code 60 with the vendor class identifier 5G CPE in a DHCP REQ packet (block 910). Upon receiving the request, 5G modem 210 may send a DHCP ACK packet and with select vendor-specific information (VSI) (e.g., configured DHCP Option code 43) (block 920). For example, VSI corresponding to non-standardized extensions described in FIG. 8 may be attached to a message container for Option code 43. In some implementations, 5G modem 210 may be configured to not include select VSI, such as IMSI and/or MDN with the vendor-defined sub-options. Router 212 and 5G modem 210 may establish connectivity using, for example, the Wi-Fi SSID and password provided to router 212 in VSI for 5G modem 210 (block 930).

Process 900 may include router 212 performing bootstrapping with bootstrap server 160 via a gNB connected to 5G modem 210 (block 940). Router 212 may perform a first attach (or first inform) process to management server 150 (block 950) using connection information received during bootstrapping. In one implementation, router 212 may provide VSI information corresponding to 5G modem 210 during the first inform.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   sending, by a first consumer-premises equipment (CPE) device to a second CPE device in a local area network (LAN), a first request for an Internet protocol (IP) address, wherein the first request is a first signaling message that includes a first protocol configuration option (PCO) providing first network-centric information for the first CPE device;
   receiving, by the first CPE device and from the second CPE device, an acknowledgement to the first request, wherein the acknowledgment is a second signaling message that includes the IP address and a second PCO providing second network-centric information for the second CPE device;
   connecting, by the first CPE device and via the second CPE device, to a bootstrap server device via a radio access network (RAN);
   receiving, by the first CPE device and via the second CPE device, attachment information associated with a network management server; and
   sending, by the first CPE device and via the second CPE device, the second network-centric information to the network management server in an attachment process using the attachment information.

2. The method of claim 1, wherein the first signaling message comprises a dynamic host configuration protocol (DHCP) request message, and wherein the first network-centric information comprises a vendor class identifier (VCI) value provided via a standardized extension of the DHCP request message.

3. The method of claim 1, wherein the second signaling message comprises a DHCP acknowledgment message, and wherein the second network-centric information comprises a vendor-specific information (VSI) value provided via a message container of the DHCP request message.

4. The method of claim 3, wherein the message container is an Option code 43 message which includes vendor-specific sub-options in another message container including at least one of an international mobile equipment identity (IMEI), an integrated circuit card identifier (ICCID), an international mobile subscriber identity (IMSI), a media access control (MAC) address, a mobile directory number (MDN), a wireless service set identifier (SSID), or a wireless password pertaining to the second CPE device.

5. The method of claim 3, wherein the first CPE device comprises a router device configured to support DHCP Option code 43 and DHCP Option code 60, and wherein the second CPE device comprises a fifth-generation (5G) modem that connects to the RAN via a next generation node B (gNB).

6. The method of claim 5, further comprising:
   configuring the router device to not send the VSI value to the 5G modem via a LAN interface.

7. The method of claim 1, wherein sending the second network-centric information to the network management server comprises using the IP address to send the second network-centric information in a third signaling message during a first attach.

8. A first consumer-premises equipment (CPE) device for a local area network (LAN), comprising:
   a communication interface;
   a memory to store instructions; and
   a processor to execute instructions to:
      send, via the communication interface to a second CPE device in the LAN, a first request for an Internet protocol (IP) address, wherein the first request is a first signaling message that includes a first protocol configuration option (PCO) providing first network-centric information for the first CPE device,
      receive, via the communication interface and from the second CPE device, an acknowledgement to the first request, wherein the acknowledgment is a second signaling message that includes the IP address and a second PCO providing second network-centric information for the second CPE device,
      connect, via the communication interface and via the second CPE device, to a bootstrap server device via a radio access network (RAN),
      receive, via the communication interface and via the second CPE device, attachment information associated with a network management server, and
      send, via the communication interface and via the second CPE device, the second network-centric information to the network management server in an attachment process using the attachment information.

9. The first CPE device of claim 8, wherein the first signaling message comprises a dynamic host configuration protocol (DHCP) request message, and wherein the first network-centric information comprises a vendor class identifier (VCI) value provided via a standardized extension of the DHCP request message.

10. The first CPE device of claim 8, wherein the second signaling message comprises a DHCP acknowledgment message, and wherein the second network-centric information comprises a vendor-specific information (VSI) value provided via a message container of the DHCP request message.

11. The first CPE device of claim 10, wherein the message container is an Option code 43 message which includes vendor-specific sub-options in another message container including at least one of an international mobile equipment identity (IMEI), an integrated circuit card identifier (ICCID), an international mobile subscriber identity (IMSI), a media access control (MAC) address, a mobile directory number (MDN), a wireless service set identifier (SSID), or a wireless password pertaining to the second CPE device.

12. The first CPE device of claim 10, wherein the first CPE device comprises a router device configured to support DHCP Option code 43 and DHCP Option code 60.

13. The first CPE device of claim 12, wherein the processor is further configured to execute the instructions to not send the VSI value to the second CPE device via a LAN interface.

14. The first CPE device of claim 8, wherein to send the second network-centric information to the network management server, the processor executes the instructions to use the IP address to send the second network-centric information in a third signaling message during a first attach.

15. A non-transitory computer-readable medium storing instructions executable by a computational device of a first consumer-premises equipment (CPE) device, to:
   send, to a second CPE device in a local area network (LAN), a first request for an Internet protocol (IP) address, wherein the first request is a first signaling message that includes a first protocol configuration option (PCO) providing first network-centric information for the first CPE device;
   receive, from the second CPE device, an acknowledgement to the first request, wherein the acknowledgment is a second signaling message that includes the IP address and a second PCO providing second network-centric information for the second CPE device;

connect, via the second CPE device, to a bootstrap server device via a radio access network (RAN);

receive, via the second CPE device, attachment information associated with a network management server; and send, via the second CPE device, the second network-centric information to CPE network management server in an attachment process using the attachment information.

16. The non-transitory computer-readable medium of claim 15, wherein the first signaling message comprises a dynamic host configuration protocol (DHCP) request message, and wherein the first network-centric information comprises a vendor class identifier (VCI) value provided via a standardized extension of the DHCP request message.

17. The non-transitory computer-readable medium of claim 15, wherein the second signaling message comprises a DHCP acknowledgment message, and wherein the second network-centric information comprises a vendor-specific information (VSI) value provided via a message container of the DHCP request message.

18. The non-transitory computer-readable medium of claim 17, wherein the message container is an Option code 43 message which includes vendor-specific sub-options in another message container including at least one of an international mobile equipment identity (IMEI), an integrated circuit card identifier (ICCID), an international mobile subscriber identity (IMSI), a media access control (MAC) address, a mobile directory number (MDN), a wireless service set identifier (SSID), or a wireless password pertaining to the second CPE device.

19. The non-transitory computer-readable medium of claim 17, wherein the first CPE device comprises a router device configured to support DHCP Option code 43 and DHCP Option code 60.

20. The non-transitory computer-readable medium of claim 19, wherein the instructions are further executable by the computational device to not send the VSI value to the second CPE device via a LAN interface.

* * * * *